Aug. 1, 1961
J. H. HOLLYDAY
2,994,178
LIFT CONTROL MECHANISM
Filed March 2, 1959
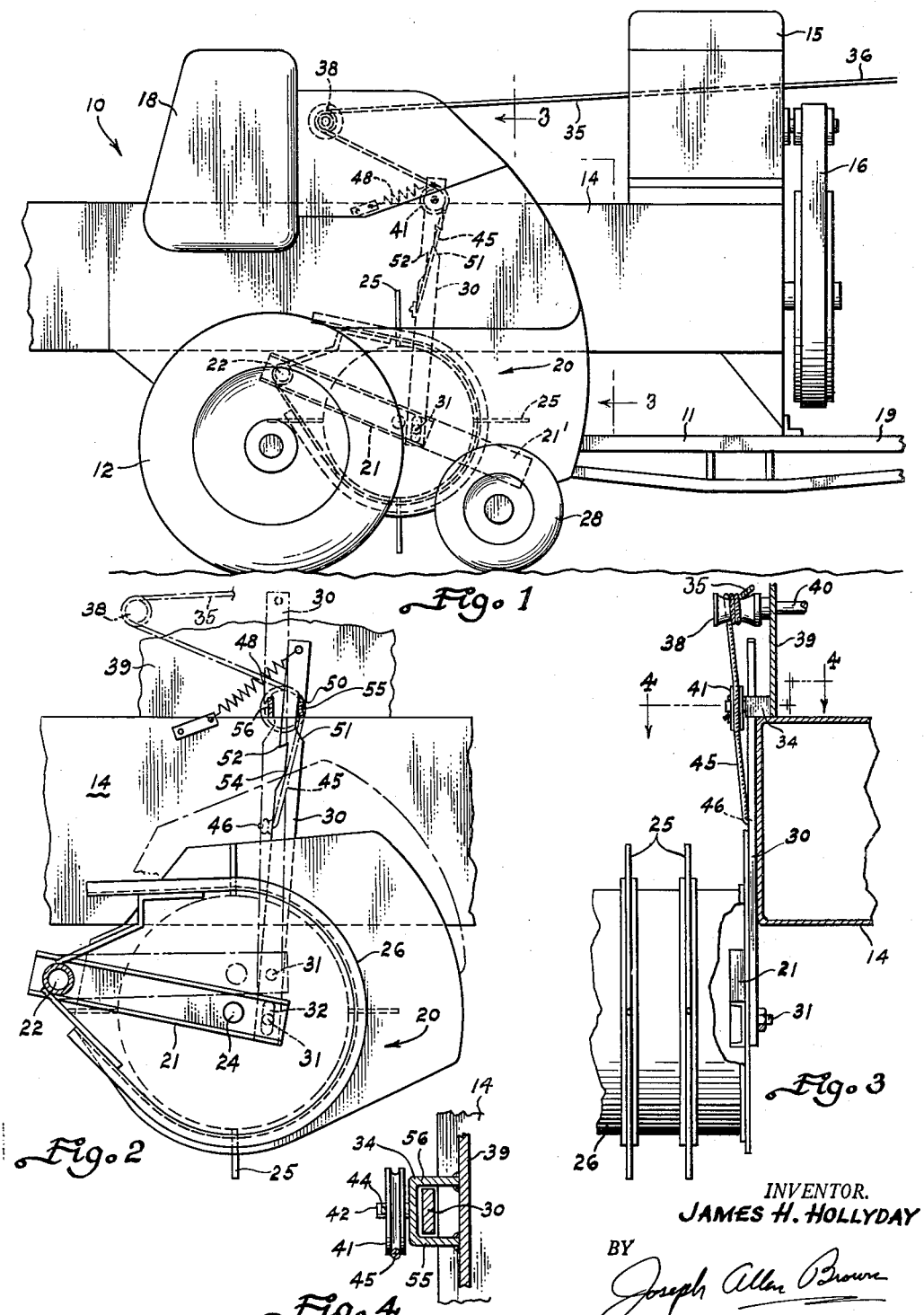
INVENTOR.
JAMES H. HOLLYDAY
BY
Joseph Allen Brown
ATTORNEY / 2,994,178
LIFT CONTROL MECHANISM
James H. Hollyday, New Holland, Pa., assignor to Sperry Rand Corporation, New Holland, Pa., a corporation of Delaware
Filed Mar. 2, 1959, Ser. No. 796,547
4 Claims. (Cl. 56—344)

This invention relates generally to pick-ups and more particularly to a control device for raising and lowering a pick-up and for releasably latching the pick-up in elevated position.

One object of this invention is to provide a control device which can be used for elevating a pick-up and latching it in a plurality of elevated positions.

Another object of this invention is to provide a pick-up control device which utilizes the manipulation of a rope to effectuate the latching of the pick-up in elevated position and for varying the latched position.

Another object of this invention is to provide a pick-up control device which includes a rope which when pulled to elevate the pick-up and then released slowly causes the pick-up to be latched in one position and when released quickly causes the pick-up to be latched in another position.

A further object of this invention is to provide power means whereby an operator receives mechanical assistance in raising and lowering a pick-up.

A still further object of this invention is to provide raising, lowering and latching control means of the character described which is of simple construction enabling it to be manufactured and sold at low cost.

Other objects of this invention will be apparent hereinafter from the specification and from the recital in the appended claims.

In the drawings:

FIG. 1 is a generally diagrammatic side elevation of a hay baler having a pick-up adapted to be raised and lowered by a control device constructed according to this invention, the pick-up being shown in lowered, operative position;

FIG. 2 is an enlarged side elevation showing the control device and the pick-up controlled thereby in one position in solid lines and in a second position in dotted lines;

FIG. 3 is a fragmentary section taken on the line 3—3 of FIG. 1 and looking in the direction of the arrows; and FIG. 4 is a section taken on the line 4—4 of FIG. 3 and looking in the direction of the arrows.

Referring now to the drawings by numerals of reference, and first to FIG. 1, 10 denotes a hay baler which includes a frame 11 supported by ground wheels 12 and including a bale case 14, a motor 15, drive means 16 and a feed mechanism housing 18. The baler has a forwardly extending tongue 19 connectable to a tractor or other vehicle for towing the baler. Extending transversely relative to direction of travel is a crop pick-up 20 which is carried on a pair of forwardly extending support arms 21 pivotally connected at their rearward ends to a cross shaft 22 whereby the pick-up can be swung up and down at its forward end. The pick-up is conventional in all respects and includes a cross shaft 24 and pick-up fingers 25. When the baler is operated, the pick-up fingers 25 engage the crop material lying on the ground and elevate it, conveying the material rearwardly for deposit in the baler. The crop material slides over fore-and-aft extending laterally spaced pick-up stripper members 26 through which the pick-up fingers 25 extend and move. The outboard arm of the support arms 21 has an extension 21' on which a ground wheel 28 is carried to cause the pick-up to raise and lower responsive to variations in ground conditions.

In FIG. 1, the pick-up is shown in lowered operative position. In some baling conditions, it is desirable to partially elevate and latch the pick-up, such as the position shown in solid lines in FIG. 2. When not in use, it is desirable to have the pick-up lifted to a still higher elevation and latched, such as the position shown in dotted lines in FIG. 2. To achieve such lifting and latching, the control device to this invention is provided and will now be described.

Extending vertically along the inboard end of pick-up 20 is a lift lever 30 pivotally connected at its lower end to inboard support arm 21. The shaft of a bolt 31 on the arm extends through a slot 32 in the lift lever whereby there is a lost motion connection between the parts. Welded to bale case 14 is a bracket 34 which is U-shaped in plan (FIG. 4), with the legs of the U facing and connected to the side of the bale case. The upper end of lift lever 30 extends through this U-shaped bracket.

Since the lower end of the lift lever is connected to the pick-up, it will be apparent that if the lift lever is moved longitudinally vertically the pick-up will be raised or lowered. For moving the lift lever, a rope 35 is provided having a forwardly extending reach 36 which extends to the operator riding on the tractor towing the baler. Rope 35 extends rearwardly to a capstan 38 mounted on wall 39 extending upwardly from the top of bale case 14. The capstan 38 includes a shaft 40 driven constantly from a source of power, not shown. Rope 36 is wrapped several times around the capstan and, as is conventional with such structures, the periphery of the capstan is very smooth whereby when rope 36 is relaxed, the capstan is able to rotate relative to the rope and when the rope is pulled taut, the capstan is able to exert a driving force on the rope. After extending around the capstan 38, rope 35 extends forwardly and downwardly to a pulley 41 rotatable on a pin 42 welded to the bight of bracket 34. The pulley is held on shaft 42 by a cotter pin 44. After extending around the pulley 41, rope 35 has a reach 45 which extends to a medial section of lift lever 30 and is connected to a pin 46 on the rearward edge of the lever.

As shown best in FIG. 2, the connection of the rope 35 with the lift lever is off center relative to the pulley 41, that is, off center relative to a vertical plane including the pulley axis. Thus, when a pulling force is exerted on reach 45 of the rope, the lift lever in addition to being elevated longitudinally is pivoted forwardly about pin 31. Such pivoting is against the resistance of a rearwardly extending biasing spring 48 connected between the upper end of the lift lever and bale case 14.

In order to latch lift lever 30 in a first elevated position, a first latch member 50 is provided, formed by a notch 51 in the forward edge of the lever. To latch the lever in a second position a second latch member 52 is provided along a rearward edge of the lift lever, this latch member being provided by notch 54 in the lever. It will be noted that the respective latch members 50 and 52 are vertically spaced relative to each other. The point of latching the pick-up in elevated position can be varied according to which latch member is utilized to hold the pick-up in elevated position.

Cooperative with the latch members 50 and 52 are fixed latch elements provided by the forward leg 55 and rearward leg 56 of the U-shaped bracket 34 through which the lift lever extends. The first latch member 50 is adapted to be engaged with forward latch element 55. The second latch member 52 is adapted to be engaged with the rearward latch element 56.

The control device is operated merely by pulling rope 35. When the rope is drawn taut, capstan 38 becomes effective and pulls on the lower reach 45 of the rope. This causes the lift lever to be elevated and pivoted into engagement with forward latch element 55. The lever slides against element 55 as the pick-up rises. When the pick-up has been elevated sufficiently to bring notch 51 into register with element 55, the operator merely has to release rope 35 gradually, whereupon the pick-up and lift lever 30 will lower and latch member 50 will hook over element 55. Because of the "hooked" connection, spring 48 is unable to pivot lever 30 and pull it away from latch element 55. Thus, it is seen that the pick-up can be lifted and latched in a first position, as shown in solid lines in FIG. 2. However, if the operator wishes to lift the pick-up to a higher inoperative position, he again pulls on rope 35 until the pick-up has been elevated sufficiently to bring the notch 54 into register with the latch element 56 or slightly above it. Then the operator releases the rope 35 quickly to allow the spring 48 to become effective and pivot the lift lever rearwardly about pin 31. Thereupon, the lift lever will swing into engagement with rearward latch element 56 and second latch member 52 will come into engagement with the rearward latch element, becoming hooked thereon. Then the pick-up will be latched in a second elevated position.

To lower the pick-up, when it is held in its highest position, the operator merely pulls on the rope 35 to cause the lift lever to be freed from element 56. Once released, the operator lets off tension on the rope slowly whereupon the pick-up drops. The operator retains sufficient tautness on the rope to allow the lift lever to pass the latch element 56 but not enough pull to cause the pick-up to come up. When latch member 52 passes element 56, rope 35 is released completely whereupon the pick-up drops. If when the pick-up is being lowered, the latch member 50 catches onto element 55, or if the pick-up is intentionally latched to element 55, the operator merely draws on rope 35 sufficiently to unlatch the latch member whereupon he quickly lets go of the rope whereupon the spring 48 pivots the lever rearwardly and allows the lever to pass element 55 and the pick-up to drop to the ground.

In practice, the manipulation of the rope 35 is easy. The operator quickly becomes accustomed to the various latching positions and through manipulation of the rope 35 he can readily latch the pick-up in one of the two selected elevated positions or drop the pick-up to the ground, as desired.

The above structure is extremely simple whereby it can be manufactured at very low cost and enable an operator to control the raising and lowering of the pick-up of his baler without having to leave the tractor.

The above description has recited the pick-up control means as being related to a hay baler. It will be obvious that the mechanism could likewise be employed with any agricultural implement having a pick-up adapted to be raised and lowered. Therefore, the recitation of a baler in the description is merely exemplary and not exclusive.

While this invention has been described in connection with a particular embodiment thereof, it will be understood that it is capable of further modification and this application is intended to cover any variations, uses or adaptations of the invention following in general, the principles of this invention and including such departures as come within known or customary practice in the art to which the invention pertains and as fall within the scope of the invention or the limits of the appended claims.

Having thus described my invention, what I claim is:

1. A control device for raising and releasably latching a pick-up of an implement, comprising a lift lever extending vertically, means pivotally connecting the lower end of said lift lever to the pick-up whereby the upper end of the lever can be moved forwardly and rearwardly, a pair of latch elements, one forwardly and one rearwardly of said lift lever and both connected to said implement, a first latch member on said lift lever engageable with said forward latch element, a second latch member on said lift lever engageable with said rearward latch element, said first and second latch members being vertically spaced relative to each other, releasable means connected to said lift lever for moving the lever longitudinally vertically and for simultaneously pivoting the lever forwardly into engagement with said forward latch element, and means connected between said lift lever and the implement biasing the lever rearwardly whereby upon release of said lifting means the lever is pivoted into engagement with said rearward latch element.

2. A control device as recited in claim 1 wherein there is provided a pulley affixed to said implement and said releasable means comprises a rope extending around said pulley and then connected to said lift lever.

3. A control device as recited in claim 2 wherein said latch members comprise hooks formed by notches in said lift lever and said first latch member when hooked over said forward latch element prevents said biasing means from pivoting said lift lever rearwardly and into engagement with said rearward latch element.

4. A control device as recited in claim 2 wherein there is provided a capstan mounted on said implement rearwardly and vertically spaced from said pulley, said rope being wrapped at least once around said capstan whereby power can be employed in raising said pick-up.

References Cited in the file of this patent

UNITED STATES PATENTS

| | | |
|---|---|---|
| 543,226 | Atwood | July 23, 1895 |
| 1,181,311 | Huber et al. | May 2, 1916 |
| 1,481,822 | Bengel | Jan. 29, 1924 |
| 2,414,958 | Lohse | Jan. 28, 1947 |
| 2,507,540 | Nolt | May 16, 1950 |
| 2,572,700 | Chapman et al. | Oct. 23, 1951 |